United States Patent
Feinberg et al.

(10) Patent No.: US 10,191,823 B2
(45) Date of Patent: Jan. 29, 2019

(54) SYSTEM AND METHOD FOR RESTORING ORIGINAL MACHINES FROM REPLICATED MACHINES IN A SECONDARY COMPUTING ENVIRONMENT

(71) Applicant: CloudEndure Ltd., Ramat Gan (IL)

(72) Inventors: Leonid Feinberg, Ramat HaSharon (IL); Ofir Ehrlich, Netanya (IL); Ophir Setter, Ramat-Gan (IL); Roman Zeyde, Afula (IL); Sigal Weiner, Holon (IL); Eran Weiss, Givataiim (IL)

(73) Assignee: CloudEndure Ltd., Ramat Gan (IL)

( * ) Notice: Subject to any disclaimer, the term of this patent is extended or adjusted under 35 U.S.C. 154(b) by 163 days.

(21) Appl. No.: 15/196,899

(22) Filed: Jun. 29, 2016

(65) Prior Publication Data
US 2017/0192859 A1   Jul. 6, 2017

Related U.S. Application Data

(60) Provisional application No. 62/273,806, filed on Dec. 31, 2015.

(51) Int. Cl.
| | |
|---|---|
| *G06F 3/06* | (2006.01) |
| *G06F 11/14* | (2006.01) |
| *G06F 11/16* | (2006.01) |
| *G06F 11/20* | (2006.01) |

(52) U.S. Cl.
CPC .......... *G06F 11/1658* (2013.01); *G06F 3/065* (2013.01); *G06F 3/0619* (2013.01); *G06F 3/0683* (2013.01); *G06F 11/1417* (2013.01); *G06F 11/2023* (2013.01); *G06F 11/2082* (2013.01)

(58) Field of Classification Search
CPC ............. G06F 11/1658; G06F 11/2023; G06F 11/2082; G06F 11/1417; G06F 3/0683; G06F 3/0619; G06F 3/065
See application file for complete search history.

(56) References Cited

U.S. PATENT DOCUMENTS 5,708,776 A * 1/1998 Kikinis ............... G06F 11/1417
714/10
6,202,091 B1    3/2001 Godse
(Continued)

FOREIGN PATENT DOCUMENTS

CN         103095759 A      5/2013

*Primary Examiner* — Paul Contino
(74) *Attorney, Agent, or Firm* — M&B IP Analysts, LLC (57) ABSTRACT

A method and system for restoring an original component from a replicated component are provided. The method includes instructing the original component in a first computing environment to boot from a restoration boot disk; synchronizing at least one original disk of the original component with at least one corresponding replicated disk of a replicated component in a second computing environment, wherein the at least one original disk maintains at least an original operating system of the original component, wherein the replicated component is configured to function in place of the original component; receiving a request to restore the original component; and instructing the original component to boot from the at least one original disk, upon determination the at least one original disk and the at least one corresponding replicated disk are consistent.

21 Claims, 4 Drawing Sheets

(56) References Cited

U.S. PATENT DOCUMENTS

| | | | |
|---|---|---|---|
| 6,485,707 B2* | 11/2002 | Zhu | A61K 9/008 |
| | | | 424/45 |
| 6,601,167 B1 | 7/2003 | Gibson et al. | |
| 6,754,855 B1* | 6/2004 | Denninghoff | G06F 9/4406 |
| | | | 714/25 |
| 6,845,464 B2* | 1/2005 | Gold | G06F 11/1417 |
| | | | 711/162 |
| 6,948,099 B1* | 9/2005 | Tallam | G06F 11/1417 |
| | | | 714/3 |
| 7,024,581 B1* | 4/2006 | Wang | G06F 11/1417 |
| | | | 713/2 |
| 7,409,584 B2* | 8/2008 | Denninghoff | G06F 9/4406 |
| | | | 713/1 |
| 7,769,990 B1* | 8/2010 | Okcu | G06F 9/4411 |
| | | | 713/1 |
| 8,122,282 B2 | 2/2012 | Betzler et al. | |
| 8,468,138 B1 | 6/2013 | Chhaunker et al. | |
| 8,712,968 B1* | 4/2014 | Chester | G06F 11/1417 |
| | | | 707/649 |
| 9,740,564 B2* | 8/2017 | Kumagai | G06F 3/0689 |
| 2002/0023225 A1* | 2/2002 | Lomnes | G06F 21/80 |
| | | | 726/30 |
| 2002/0055991 A1 | 5/2002 | Arrouye et al. | |
| 2004/0098426 A1* | 5/2004 | Ishii | G06F 11/1458 |
| 2004/0123188 A1 | 6/2004 | Srinivasan et al. | |
| 2007/0055853 A1* | 3/2007 | Hatasaki | G06F 9/4401 |
| | | | 713/1 |
| 2007/0220304 A1* | 9/2007 | Slater | G06F 11/1464 |
| | | | 714/4.11 |
| 2008/0016387 A1* | 1/2008 | Bensinger | G06F 11/1451 |
| | | | 714/4.11 |
| 2008/0133963 A1* | 6/2008 | Katano | G06F 11/0712 |
| | | | 714/4.1 |
| 2008/0276123 A1* | 11/2008 | Sudhakar | G06F 11/1469 |
| | | | 714/6.12 |
| 2010/0031079 A1* | 2/2010 | Gupta | G06F 11/1433 |
| | | | 714/4.1 |
| 2010/0223610 A1 | 9/2010 | DeHaan et al. | |
| 2010/0257142 A1 | 10/2010 | Murphy et al. | |
| 2011/0107165 A1 | 5/2011 | Resch et al. | |
| 2011/0252001 A1* | 10/2011 | Bensinger | G06F 11/2097 |
| | | | 707/658 |
| 2012/0054477 A1* | 3/2012 | Lubars | G06F 9/4406 |
| | | | 713/2 |
| 2012/0078855 A1 | 3/2012 | Beatty et al. | |
| 2012/0084355 A1 | 4/2012 | Locker et al. | |
| 2012/0151257 A1* | 6/2012 | Tam | G06F 11/1417 |
| | | | 714/15 |
| 2012/0278283 A1 | 11/2012 | Hildebrand et al. | |
| 2013/0111471 A1 | 5/2013 | Chandrasekaran | |
| 2013/0268561 A1 | 10/2013 | Christie et al. | |
| 2013/0326260 A1* | 12/2013 | Wei | G06F 11/20 |
| | | | 714/3 |
| 2014/0195848 A1* | 7/2014 | Teli | G06F 11/1469 |
| | | | 714/15 |
| 2014/0279915 A1 | 9/2014 | Gadish et al. | |
| 2015/0149412 A1* | 5/2015 | Kobres | G06F 9/4416 |
| | | | 707/640 |
| 2015/0301880 A1* | 10/2015 | Allu | G06F 11/0709 |
| | | | 714/4.3 |
| 2016/0239396 A1* | 8/2016 | Deng | G06F 11/2007 |
| 2016/0267275 A1 | 9/2016 | Gschwind | |
| 2016/0283281 A1 | 9/2016 | Antony | |
| 2016/0364252 A1 | 12/2016 | Graf et al. | |

* cited by examiner

SYSTEM AND METHOD FOR RESTORING ORIGINAL MACHINES FROM REPLICATED MACHINES IN A SECONDARY COMPUTING ENVIRONMENT

CROSS-REFERENCE TO RELATED APPLICATIONS

This application claims the benefit of U.S. Provisional Application No. 62/273,806 filed on Dec. 31, 2015, the contents of which are hereby incorporated by reference. This application incorporates by reference U.S. patent application Ser. No. 14/205,083 filed on Mar. 11, 2014, and U.S. patent application Ser. No. 14/870,652 filed on Sep. 30, 2015, all assigned to the same assignee.

TECHNICAL FIELD

The disclosure generally relates to replicating machines from one computing environment to another, and particularly to restoring an original machine from a replicated machine.

BACKGROUND

Computer servers provide access to a plethora of services, many of which are supplied over a network and on-demand in a cloud computing environment. In general, cloud computing environments allow for developing scalable applications in which computing resources are utilized to support efficient execution of the applications.

Organizations and businesses that develop, provide, or otherwise maintain cloud-based applications have become accustomed to relying on these services and implementing various types of environments, from complex web sites to data mining systems and much more. However, there is a challenge as greater reliance is made on such systems, since such systems have to maintain a very high up-time and any failure may become highly problematic and/or costly to a user of the system. That is, there is a requirement to allow for business continuity. For example, for an e-commerce application executed in a cloud-based environment, any downtime of such application means revenue and/or good will lost. As a result, providers of such applications often utilize measures to ensure continuity of operations by backing up information that is relevant to maintaining operations.

Some backup and restoration solutions, discussed in the related art, attempt to initialize a replicated machine in place of an original machine. A machine can be a physical machine (e.g., a server) or a virtual machine hosted by a physical machine. Such solutions may require significant down time when switching from the original machine to the replicated machine, and then again when switching back to operating with the original machine after data has accumulated in the replicated machine which does not exist in the original machine. This may require manual modifications to account for differences between the original machine and the replicated machine. For example, when a machine allocated in the cloud-environment for execution of the application includes certain firewall configuration parameters, these parameters have to be copied manually to the respective backup machine if the user or provider desires that such parameters be identical in character to those of the backed-up machine.

It would be therefore advantageous to provide a solution to improve the deficiencies of the prior art.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a method for restoring an original component from a replicated component. The method comprises instructing the original component in a first computing environment to boot from a restoration boot disk; synchronizing at least one original disk of the original component with at least one corresponding replicated disk of a replicated component in a second computing environment, wherein the at least one original disk maintains at least an original operating system of the original component, wherein the replicated component is configured to function in place of the original component; receiving a request to restore the original component; and instructing the original component to boot from the at least one original disk, upon determination the at least one original disk and the at least one corresponding replicated disk are consistent.

Certain embodiments disclosed herein also include a method for restoring an original component to a secondary original component, from a replicated component. The method comprises instructing the original component (OC) in a first computing environment to boot from a restoration operating system; synchronizing at least one secondary original disk of the secondary original component from a replicated disk of a replicated component (RC) in a second computing environment, wherein the replicated disk corresponds to at least one original disk of the original component, wherein the replicated component is configured to function in place of the original component; receiving a request to restore the original component; and instructing the secondary original component to boot from the original component, upon determination that the at least one secondary original disk and the corresponding replicated disk are consistent, wherein the at least one original disk maintains at least the original operating system of the original component.

Certain embodiments disclosed herein also include a system for restoring an original component from a replicated component. The system comprises: a processing circuitry; and a memory, the memory containing instructions that, when executed by the processing circuitry, configure the system to: instruct the original component in a first computing environment to boot from a restoration boot disk; synchronize at least one original disk of the original component with at least one corresponding replicated disk of a replicated component in a second computing environment, wherein the at least one original disk maintains at least an original operating system of the original component, wherein the replicated component is configured to function in place of the original component; receive a request to restore the original component; and instruct the original component to boot from the at least one original disk, upon determination the at least one original disk and the at least one corresponding replicated disk are consistent.

Certain embodiments disclosed herein also include a system for restoring an original component to a secondary original component, from a replicated component. The system comprises: a processing circuitry; and a memory, the memory containing instructions that, when executed by the processing circuitry, configure the system to: instruct the original component in a first computing environment to boot from a restoration operating system; synchronize at least one secondary original disk of the secondary original component from a replicated disk of a replicated component in a second computing environment, wherein the replicated disk corresponds to at least one original disk of the original component, wherein the replicated component is configured to function while the original component; receive a request to restore the original component; and instruct the secondary original component to boot from the original component, upon determination that the at least one secondary original disk and the corresponding replicated disk are consistent, wherein the at least one original disk maintains at least the original operating system of the original component.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

According to some embodiments, a system and method for restoring an original component from replicated components in a second computing environment are presented. In an embodiment, an original component (OC), including at least an original disk having an original operating system (OS), and a restoration boot disk having a restoration OS, is configured to boot from the restoration OS. Data from the at least an original disk of the OC is synchronized from a corresponding replicated disk on a replicated component. Upon receiving a request to restore the OC, the OC is configured to boot from the original OS, upon determination that the at least an original disk and the corresponding replicated disk are consistent.

Figure 1:
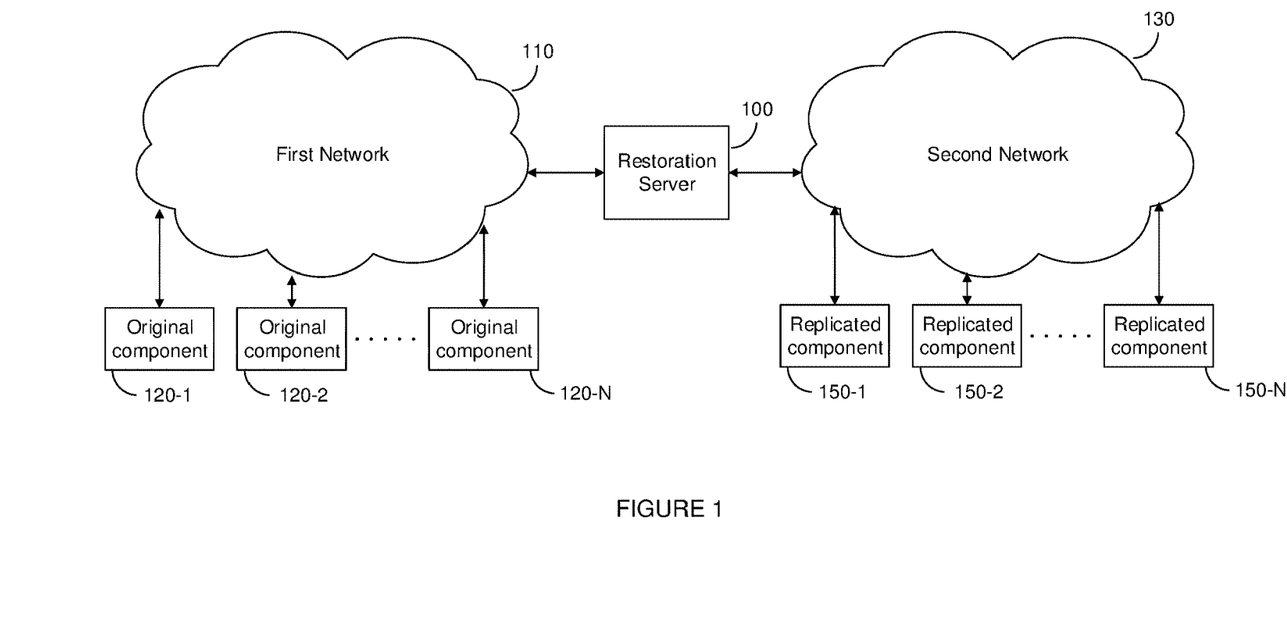
FIG. 1 is a diagram of a cloud-computing platform utilized to describe the various disclosed embodiments.

FIG. 1 is an example diagram of a cloud-computing platform utilized to describe the various disclosed embodiments restoring an original component from a replicated component implemented in accordance with an embodiment. As shown in FIG. 1, a restoration server 100 is communicatively connected with a first network 110 and a second network 130. The first network 110 provides connectivity for a first cloud-computing environment. The second network 130 provides connectivity for a second computing environment, in which the first computing environment may be replicated. In certain embodiments, the first computing environment and the second computing environment may be one computing environment. Each of the first and second computing environments may be a public cloud computing environment ("cloud"), a private cloud, a hybrid cloud, or a combination thereof.

Figure 4:
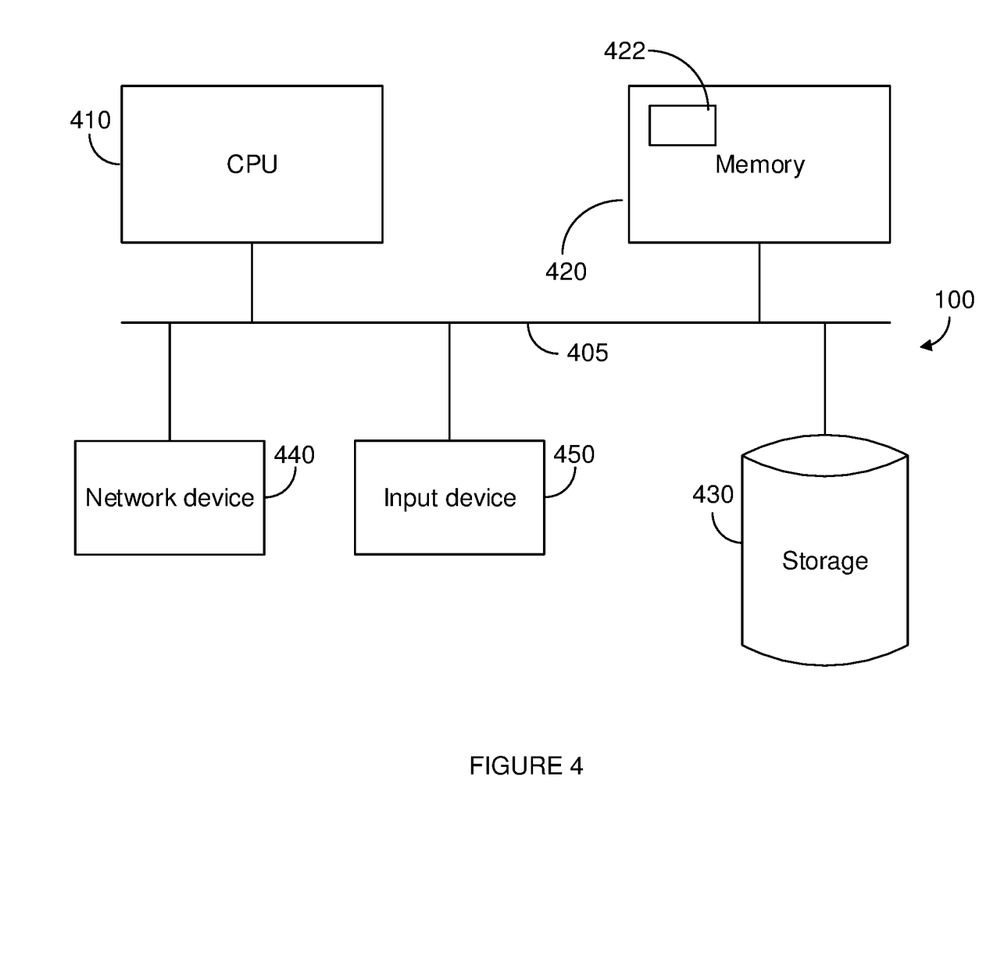
FIG. 4 is a block diagram of the restoration server according to an embodiment.

The restoration server 100 is configured to execute a process for restoring original machines from replicated machines operating within a network and implemented according to an embodiment, as shown in further detail in FIG. 4.

Each of the first network 110 and the second network 130 is configured to provide connectivity of various sorts as may be necessary including, but not limited to, wired and/or wireless connectivity such as, for example, local area network (LAN) connectivity, wide area network (WAN) connectivity, metro area network (MAN) connectivity, worldwide web (WWW) connectivity, Internet connectivity, and any combination thereof, as well as cellular connectivity. In some configurations, the network 110 may include a virtual private network (VPN).

Original components 1 through N ($OC_1$ through $OC_N$) labeled 120-1 through 120-N (hereinafter referred to individually as an OC 120 and collectively as OCs 120, merely for simplicity purposes) are communicatively connected to the network 110 and collectively compose the first computing environment. An OC 120 may be a physical machine, a virtual machine, a service or services, and the like. A physical machine may be, for example, a web server, a database server, a cache server, a load balancer, and the like. A virtual machine may be, for example, any virtual appliance. A service may be a network architecture management service, load balancing service, auto scaling service, content delivery network (CDN) service, network addresses allocation service, database services and domain name system (DNS) services, and the like.

Replicated components 1 through N, ($RC_1$ through $RC_N$) labeled 150-1 through 150-N (hereinafter referred to individually as an RC 150 and collectively as RCs 150, merely for simplicity purposes) are each communicatively connected to the second network 130. Each RC corresponds to an OC, such that $RC_1$ corresponds to $OC_1$, and generally $RC_i$ corresponds to $OC_i$, where 'N' is a natural integer having a value of '1' or greater and 'i' having a value of '1' through 'N'. A RC 150 may be a physical machine, a virtual machine, a service or services, and the like.

In an embodiment, the network 110 includes a VPN, where a portion or all of the OCs 120 may be included in the VPN. Each OC 120 may further include any of: a root disk, a boot disk, and a data disk (not show in FIG. 1). In some embodiments, the OC 120 may also include a plurality of data disks. Any of the data disk(s), the root disk, or the boot disk may be implemented on a single logical drive or physical disk. Alternatively, any of the data disk(s), the root disk, or the boot disk may be implemented on a disk of a plurality of logical drives or physical disks. The OCs 120 are each configured to boot from a restoration boot disk (not shown). The restoration boot disk may include a restoration operating system (OS) configured to initiate and perform a data synchronization from a replicated data disk on a RC 150 to a corresponding data disk of an OC 120. The restoration OS is different from the OS of the OC 120 and designed merely to operate when the OC 120 is in a failure mode. The restoration boot disk may be a hard disk drive, an optical disc, a USB device, a network disk, an external storage drive, a virtual disk, and the like.

An OC 120 may fail while processing its workload. According to the disclosed embodiments, in order to provide maximum uptime of the service provided by the OC 120, a corresponding RC 150 is synchronized with the OC 120. This allows the RC 150 to provide the service(s) of the OC 120 when the OC 120 suffers a fail and/or when the OC 120 is overloaded. Upon resolving the failure, the OC 120 should be brought back online. It is apparent that the OC 120 may be offline, or otherwise cease to provide services for any reason which may not necessarily be considered a failure, without departing from the scope of this disclosure.

In order for the transition to be as seamless as possible with little to no downtime, the data on the OC 120 is synchronized from the data on the RC 150. An OC 120 is configured to boot from the restoration OS, synchronize its OC disks from the corresponding replicated disks (in a corresponding RC 150), and reboot from the boot disk of the OC 120. This process is performed and controlled by the restoration server 100 as further detailed herein in FIG. 2. An OC disk may be the original data disk(s), the original root disk, the original boot disk or any combination of the above.

Figure 2:
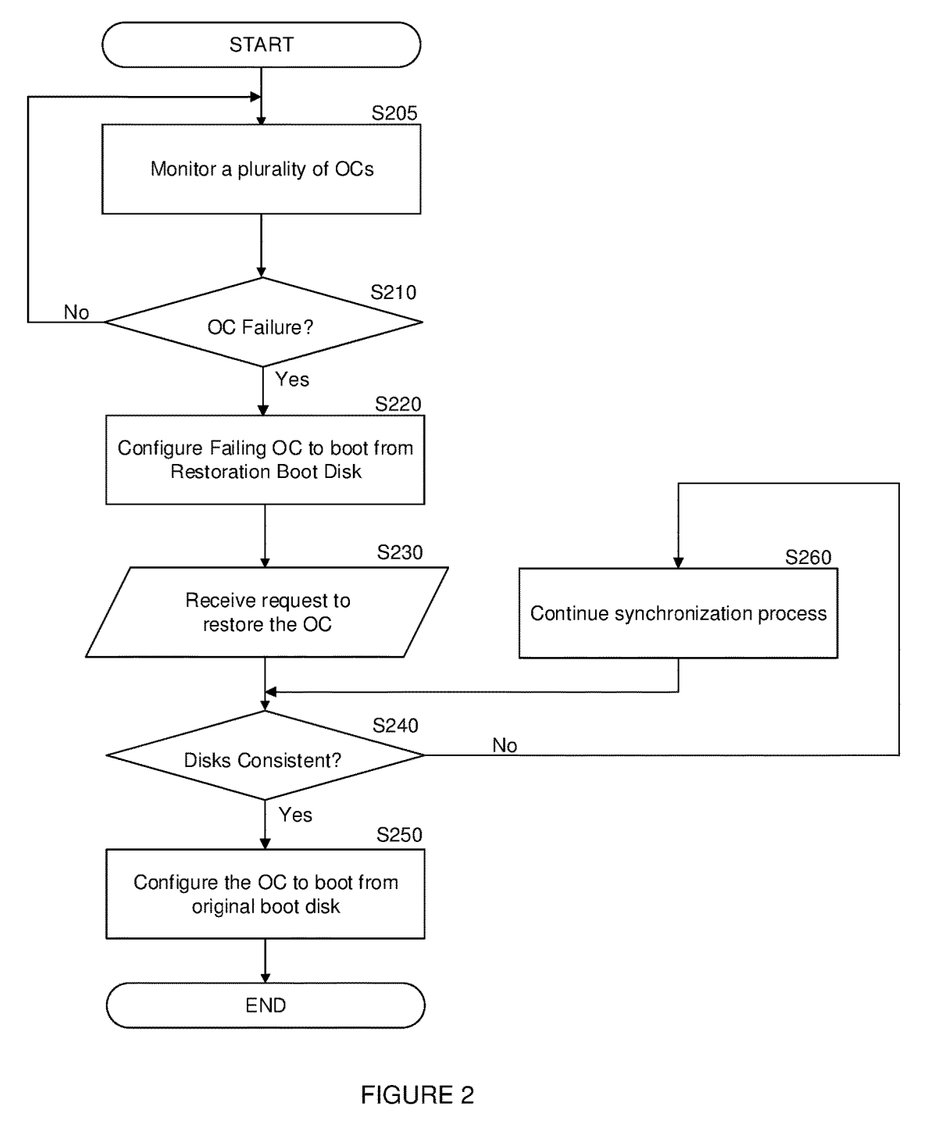
FIG. 2 is a flowchart illustrating a method for restoring an original component from a replicated component according to one embodiment.

FIG. 2 is an example flowchart 200 of a method for restoring an original component from a replicated component implemented in accordance with an embodiment. As noted above, the restoration method can be performed and controlled by the restoration server 100.

At S205, the status of each of the OCs 120 is monitored to detect a failure in any of the OCs. The failure may be a hardware failure, a software failure, an overload of one of the hardware/software resources of the OC, and so on. In certain embodiments, failure may be a failure to provide the service(s) the OC 120 typically provides, for example by an initiated shutdown. The status monitoring can be performed by reports or signals periodically provided by the OCs 120 or pulled by the OCs 120. As an example, the reports may include information about the load and/or functionality of each resource of an OC, ping signals, and so on.

At S210, it is checked if an OC 120 is experiencing a failure or cannot function properly. For example, when the OC 120 performance or throughput is below a certain predefined threshold. If so, execution continues with S220; otherwise, execution returns to S205. In an embodiment, S210 may further include checking if the failure is a fatal failure of the OC 120 or one of its components. Each OC 120 detected with a failure is determined to be in a failure mode.

At S220, each OC 120 determined to be in a failure mode is instructed to boot from its restoration boot disk. As noted above, the restoration boot disk includes a restoration boot disk having a restoration OS. The OC is configured to boot from the restoration OS. In some embodiments, initialization of the booting process is triggered by an instruction sent to the OC 120 by, for example, the restoration server 100.

The boot process (executed by the OS of the restoration boot disk) would initiate a synchronization process to synchronize any of the OC disks of an OC determined to be in a failure mode (e.g., OC 120-1) from a corresponding replicated disk of a RC corresponding to the OC. As noted above, each OC 120 is installed with an OC disk that may include a boot disk, a root disk, and/or one or more data disks. Such an OC disk may be implemented as a single logical or physical drive, as a plurality of logical and/or physical drives, or combinations thereof.

It should be noted that, while the OC (e.g., OC 120-1) is in a failure mode, a corresponding RC (e.g., RC 150-1) functions in its stead. For at least one OC disk on the OC (e.g., OC 120-1), there is a corresponding replicated disk on the RC (e.g., RC 150-1). While the RC functions in the OC's stead, the replicated disk(s) of the RC typically store data which differs from the data stored on the corresponding OC disk in the OC. It is therefore necessary to perform a synchronization before bringing the OC back online and instating normal functionality. Booting from a restoration boot disk and OS thereof allows synchronizing data more efficiently, in addition to making system changes on boot and root disks if there is cause to do so.

At S230, a request is received to restore the OC (e.g., OC 120-1) from the RC (e.g., RC 150-1). The OC may be restored to the original component, or in some embodiments, to a secondary OC. This may occur, for example, when the original OC is in a fatal failure mode. In an embodiment, the request may be sent from the OC. In another embodiment, the request may be initiated by a restoration server upon detection that the OC is online after having been in failure mode.

At S240, a check is performed to determine if the OC disk as replicated to the OC (e.g., OC 120-1) is consistent with the OC disk in the corresponding RC (e.g., RC 120-1). Disk consistency occurs if there is a point in time where an OC disk is identical to a corresponding replicated disk on an RC. If so, execution continues with S250; otherwise, execution continues with S260.

At S250, the OC (e.g., OC 120-1) is configured to boot from the boot disk upon determination that the OC disk is consistent with the corresponding replicated disk. While the RC is operational, data in the replicated disks of the RC is continuously synchronized with the corresponding OC disk. Therefore, the OC 120-1 can start the boot process without having the OC disk fully synchronized. This significantly reduces the restoration time and downtime of the OC. Further, as the OC synchronization request is triggered prior to the initialization of the OC disk restoration, upon receiving the disk restoration request, the OC disk in the OC 120 may be ready, thereby reducing the downtime of the OC.

At S260 the synchronization process is continued by the OS of the restoration boot disk to synchronize any of the OC disks of the OC (e.g., OC 120-1) from a corresponding replicated disk of RC (e.g., RC 150-1) corresponding to the OC.

In some embodiments, an OC 120 may be completely replaced by a secondary OC. This may happen, for example, due to a fatal error such as irreparable damage to the original component. For example, if OC 120-1 is in a fatal error mode, a restoration may be initiated to a secondary OC 120-2 from a RC corresponding to OC 120-1 (e.g., RC 150-1). In such embodiments, the synchronization process of S320 is initiated between the RC and the second original component. The method is executed accordingly with the original component being replaced by the second original component.

Figure 3:
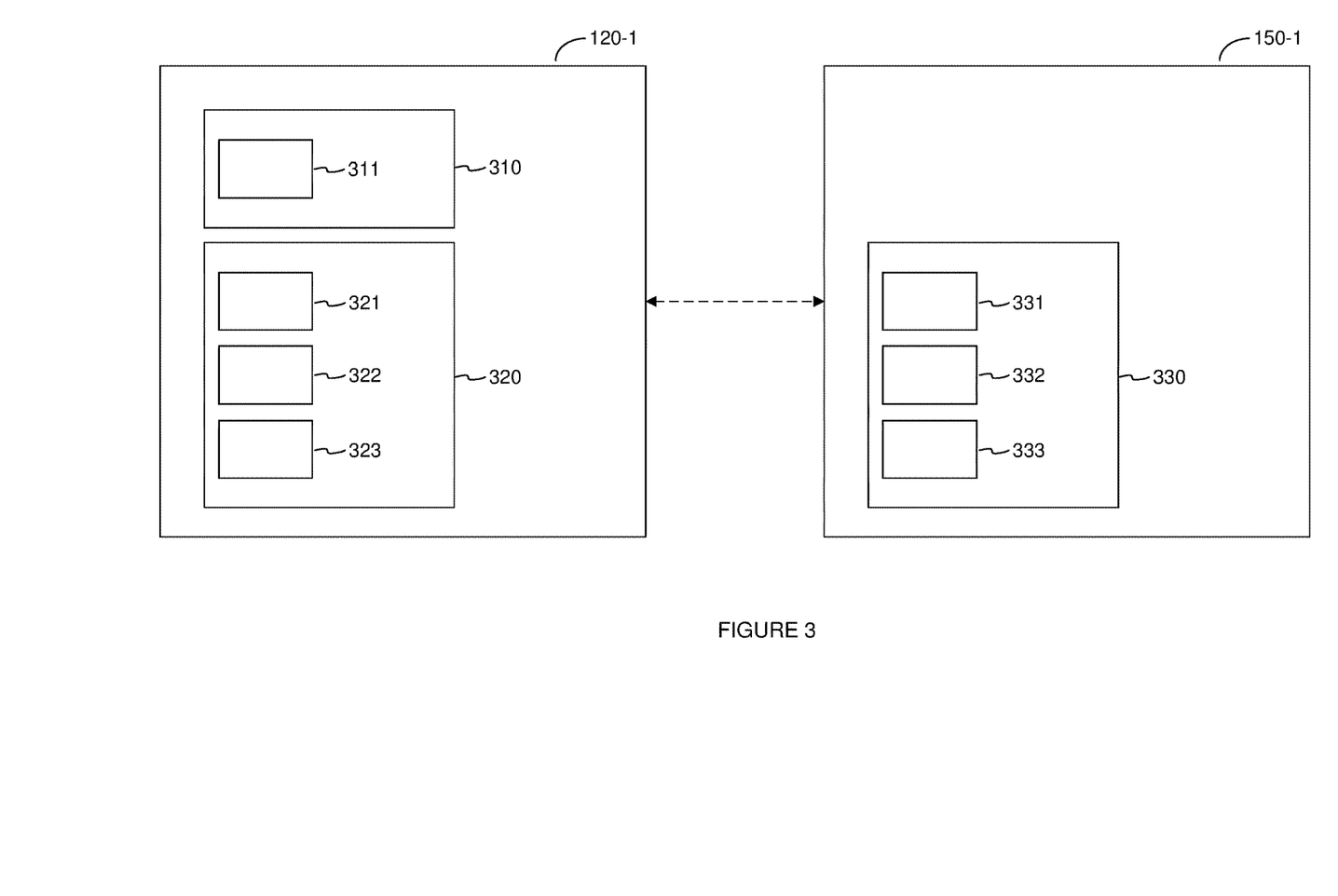
FIG. 3 is a diagram demonstrating the restoration process of an OC from a corresponding RC according to an embodiment.

FIG. 3 demonstrates the restoration process of an OC 120-1 from a corresponding RC 150-1 according to one embodiment. Each of the OC 120-1 and the RC 150-1 may be a physical machine, a virtual machine, a service, and the like. The OC 120-1 includes a restoration boot disk 310 and an OC disk 320. The restoration boot disk 310 includes a restoration OS 311 and may be realized as a hard disk drive, an optical disc, a USB device, a network disk, an external storage drive, a virtual disk, and the like. The restoration OS is configured to initiate and perform a data synchronization from a replicated OC disk 330 on the RC 150-1 to a corresponding OC disk 320 of the OC 120-1. The restoration OS is different from the OS of the OC 120-1 and is designed merely to operate when the OC 120-1 is in a failure mode.

The OC disk 320 includes a boot disk 321, a root disk 322, and a data disk 323. The OC disk 320 may be implemented as a single logical or physical drive, as a plurality of logical and/or physical drives, or combinations thereof. The RC 150-1 also includes an OC disk 330 which is a replicate of the OC disk 320. That is, the contents (in a certain point in time) of the boot disk 321, the root disk 322, and the data disk 323 are identical to the contents in a boot disk 331, a root disk 332, and a data disk 333 included in the RC's OC disk 330.

The restoration process starts by booting from the restoration boot disk 310. Specifically, the restoration OS 311, during the boot process, would initiate a synchronization process synchronizing the contents of the OC disk 320 from the replicated OC disk 330. For example, the contents of the replicated data disk 333 will be copied to the data disk 323. Upon determination that the replicated OC disk 330 and the OC disk 320 are consistent, the OC 120-1 is instructed to boot from the OS stored in the boot disk 321.

In an embodiment, at least the contents of the boot disks 321 and 331 should be synchronized in order to initiate the restoration, i.e., booting from the OS of the OC 120-1. The contents of the root disk 322 and/or data disk 323 can be synchronized during or immediately after the completion of the boot process.

FIG. 4 is an example block diagram of the restoration server 100 implemented according to an embodiment. The restoration server 100 includes at least one processing system (CPU) 410. In an embodiment, the processing system 410 includes, or is a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 410 is coupled via a bus 405 to a memory 420. The memory 420 further includes a memory portion 422 that contains instructions that when executed by the processing system 410 performs the restoration method described in more detail with reference to FIG. 2. The memory may be further used as a working scratch pad for the processing system 410, a temporary storage, and others, as the case may be. The memory may be a volatile memory such as, but not limited to random access memory (RAM), or non-volatile memory (NVM), such as, but not limited to, Flash memory.

The processing system 410 may be coupled to an input device 450 and to a network interface 440, for providing connectivity between the restoration server 100 and a network, such as the first network 110 and/or second network 130, discussed in more detail with respect to FIG. 1. The processing system 410 may be further coupled with a storage 430. The storage 430 may be used for the purpose of holding a copy of the method executed in accordance with the disclosed technique.

The processing system 410 and/or the memory 420 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. For the purpose of this disclosure, the terms 'machine' and 'component' are used interchangeably.

What is claimed is:

1. A method for restoring an original component from a replicated component, comprising:
   instructing the original component in a first computing environment to boot from a restoration boot disk;
   synchronizing at least one original disk of the original component with at least one corresponding replicated disk of a replicated component in a second computing environment different from the first computing environment, wherein the at least one original disk maintains at least an original operating system of the original component, wherein the replicated component is configured to function in place of the original component;
   receiving a request to restore the original component; and
   instructing the original component to boot from the at least one original disk, upon determination the at least one original disk and the at least one corresponding replicated disk are consistent.

2. The method of claim 1, wherein instructing the original component to boot from the restoration disk occurs upon detection that the original component is in a failure mode.

3. The method of claim 1, further comprising:
monitoring a status of the original component; and
determining if the original component is in a failure mode based on the monitoring.

4. The method of claim 1, further comprising:
continuing the synchronization of the at least one original disk with the at least one corresponding replicated disk, until the at least one original disk and the at least one corresponding replicated disk are consistent.

5. The method of claim 1, wherein the restoration boot disk is any of: a hard disk drive, an optical disc, a USB device, a network disk, an external storage drive, and a virtual disk.

6. The method of claim 1, wherein the at least one original disk includes at least one of: a first original data disk, a boot disk, and a root disk.

7. The method of claim 5, wherein the restoration boot disk and the first original data disk are implemented as a single logical and physical drive.

8. The method of claim 1, wherein the original component and the replicated component each execute a first operating system under normal operating conditions and wherein the restoration boot disk causes the original component to boot a restoration operating system, the restoration operating system being a limited operating system that at least starts a synchronization process from the replicated component to the original component.

9. The method of claim 8, further comprising:
synchronizing each of the at least one original data disk of the original component from a corresponding replicated data disk of the at least one corresponding replicated data disk.

10. The method of claim 1, wherein the first computing environment and the second computing environment are different cloud computing platforms.

11. The method of claim 1, wherein the original component and the replicated component each execute a first operating system under normal operating conditions and wherein the restoration boot disk causes the original component to boot a restoration operating system, the restoration operating system being different from the first operating system.

12. A non-transitory computer readable medium having stored thereon instructions for causing one or more processing units to execute the method according to claim 1.

13. A method for restoring an original component that was running an original operating system to a secondary original component, from a replicated component, comprising:
instructing the original component in a first computing environment to boot from a restoration operating system;
synchronizing at least one secondary original disk of the secondary original component from a replicated disk of the replicated component in a second computing environment different from the first computing environment, wherein the replicated disk corresponds to at least one original disk of the original component, wherein the replicated component is configured to function in place of the original component;
receiving a request to restore the original component; and
instructing the secondary original component to boot from the original component, upon determination that the at least one secondary original disk and the corresponding replicated disk are consistent, wherein the at least one original disk maintains at least the original operating system of the original component.

14. The method of claim 13, wherein instructing the original component to boot from the operating system occurs upon detection that the original component is in a failure mode.

15. The method of claim 13, further comprising:
monitoring a status of the original component; and
determining if the original component is in a failure mode when the original component is irreparably damaged.

16. The method of claim 13, further comprising:
continuing the synchronization of the at least one secondary original disk from the replicated disk, until the at least one secondary original disk and the replicated disk are consistent.

17. The method of claim 13, wherein the first computing environment and the second computing environment are at least different cloud computing platforms.

18. The method of claim 13, wherein each of the original component and the replicated component is any of: a service, a virtual machine, and a physical machine operable in the cloud computing platform.

19. A non-transitory computer readable medium having stored thereon instructions for causing one or more processing units to execute the method according to claim 13.

20. A system for restoring an original component from a replicated component, comprising:
a processing circuitry; and
a memory, the memory containing instructions that, when executed by the processing circuitry, configure the system to:
instruct the original component in a first computing environment to boot from a restoration boot disk;
synchronize at least one original disk of the original component with at least one corresponding replicated disk of a replicated component in a second computing environment different from the first computing environment, wherein the at least one original disk maintains at least an original operating system of the original component, wherein the replicated component is configured to function in place of the original component;
receive a request to restore the original component; and
instruct the original component to boot from the at least one original disk, upon determination the at least one original disk and the at least one corresponding replicated disk are consistent.

21. A system for restoring an original component that was running an original operating system to a secondary original component, from a replicated component, comprising:
a processing circuitry; and
a memory, the memory containing instructions that, when executed by the processing circuitry, configure the system to:
instruct the original component in a first computing environment to boot from a restoration operating system;
synchronize at least one secondary original disk of the secondary original component from a replicated disk of the replicated component in a second computing environment different from the first computing environment, wherein the replicated disk corresponds to at least one original disk of the original component, wherein the replicated component is configured to function in place of the original component;

receive a request to restore the original component; and instruct the secondary original component to boot from the original component, upon determination that the at least one secondary original disk and the corresponding replicated disk are consistent, wherein the at least one original disk maintains at least the original operating system of the original component.

\* \* \* \* \*